(12) United States Patent
Bobbitt et al.

(10) Patent No.: US 8,694,443 B2
(45) Date of Patent: Apr. 8, 2014

(54) SYSTEM AND METHOD FOR AUTOMATICALLY DISTINGUISHING BETWEEN CUSTOMERS AND IN-STORE EMPLOYEES

(75) Inventors: Russell P. Bobbitt, Pleasantville, NY (US); Quanfu Fan, Somerville, MA (US); Sharathchandra U. Pankanti, Darien, CT (US); Akira Yanagawa, New York, NY (US); Yun Zhai, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 12/263,928

(22) Filed: Nov. 3, 2008

(65) Prior Publication Data
US 2010/0114802 A1      May 6, 2010

(51) Int. Cl.
*G06F 15/18* (2006.01)
(52) U.S. Cl.
USPC ............................................................ 706/12
(58) Field of Classification Search
None
See application file for complete search history.

(56) References Cited

U.S. PATENT DOCUMENTS

| | | | |
|---|---|---|---|
| 7,068,842 B2 | 6/2006 | Liang et al. | |
| 7,933,451 B2* | 4/2011 | Kloer | 382/190 |
| 2003/0113002 A1 | 6/2003 | Philomin et al. | |
| 2009/0141940 A1* | 6/2009 | Zhao et al. | 382/103 |
| 2010/0054540 A1* | 3/2010 | Brown et al. | 382/107 |

OTHER PUBLICATIONS

Yang, H-D et al., "Multiple Pedestrian Detection and Tracking based on Weighted Temporal Texture Features," IEEE Proceedings of the 17th International Conference on Pattern Recognition (ICPR'04), 4 pages, 2004.
Hilton, A., "Towards Model-Based Capture of a Persons Shape, Appearance and Motion," IEEE International Workshop on Modeling People, Corfu, Greece, Sep. 20, 1999, 8 pages.
Chang, Y. et al., "People Identification with Limited Labels in Privacy-Protected Video," International Conference on Multimedia & Expo (ICME'06), Toronto, Ontario, Canada, Jul. 9-12, 2006, 4 pages.
Chen, C-Y et al., "Background Modeling and Object Tracking Using Multi-Spectral Sensors," VSSN'06, Oct. 27, 2006, Santa Barbara, California, pp. 27-34.
Essa, I., "Computers Seeing People," American Association for Artificial Intelligence, AI Magazine, Summer 1999, pp. 69-82.

* cited by examiner

*Primary Examiner* — Jeffrey A Gaffin
*Assistant Examiner* — Paulinho E Smith
(74) *Attorney, Agent, or Firm* — Matthew Chung; Keohane & D'Alessandro, PLLC (57) ABSTRACT

An approach that automatically distinguishes between in-store customers and in-store employees is provided. In one embodiment, there is a learning tool configured to construct a model for an in-store employee; a matching tool configured to match attributes between a particular person and the constructed models for an in-store employee; and a classifying tool configured to classify persons into categories of employees and customers based on amount of matching attributes between a particular person and the model for an in-store employee.

20 Claims, 6 Drawing Sheets

SYSTEM AND METHOD FOR AUTOMATICALLY DISTINGUISHING BETWEEN CUSTOMERS AND IN-STORE EMPLOYEES

FIELD OF THE INVENTION

The present invention generally relates to surveillance systems. Specifically, the present invention provides a method for automatically classifying persons recorded by a retail surveillance system.

BACKGROUND OF THE INVENTION

In today's retail industry, surveillance systems provide a whole new level of pro-active control and monitoring. Network video technology not only offers superior loss prevention, but it can also be used to boost sales, improve staff and customer security, optimize store layouts, boost productivity, count people for statistical purposes, monitor flow control, and to improve many more key functions.

The retail industry faces though challenges. Theft and inventory shrinkage are obvious causes of lost profits that are traditionally fought with surveillance systems. Also, retail surveillance offers instant benefits to businesses not only by helping to win the battle of protecting such businesses, but also by preventing crime and by making major positive contributions to planning and maximizing profits.

Unfortunately, with increased volumes of shoppers and in-store employees, theft is growing at an alarming rate. In an attempt to detect such theft, many variations of in-store surveillance systems are implemented. Data gathered by such systems is often analyzed and, based on such analysis, further actions are determined. Many of such systems will benefit greatly if such collected data is classified. For instance, there is an obvious advantage in separating data relating to shoppers from data relating to in-store employees.

SUMMARY OF THE INVENTION

The proposed invention solves a particular problem of distinguishing in-store employees from customers by analyzing the joint pattern between object's appearance e.g., color, uniform, existence of clothes distinctive for outside, and spatial patterns e.g. locations with respect to store's objects. The proposed system is further able to conclude what is most likely to be the appearance of an employee and where they are most likely to appear.

Ability to distinguish between in-store employees from in-store customers in retail sector provides potential for many surveillance applications to classify the prevention of either shoplifting by customers or sweet-hearting by employees. Further, such distinguishing allows for more control in preventing "void without customer's presence" operations by employees.

The core idea of the proposed invention is to automatically classify and distinguish in-store employees from in-store customers by analyzing video input from cameras deployed in retail stores. The proposed framework learns the joint distribution of spatial properties and appearance models of the observed objects in the camera field-of-view.

In one embodiment, there is a method for automatically distinguishing in-store employees from in-store customers, the method comprising: learning attributes of in-store employees for constructing a model for an in-store employee; and classifying persons into categories of employees and customers based on an amount of matching attributes between a particular person and the constructed model for an in-store employee.

In a second embodiment, there is a system for automatically distinguishing in-store employees from in-store customers, the system comprising: at least one processing unit; memory operably associated with the at least one processing unit; a learning tool storable in memory and executable by the at least one processing unit, the learning tool configured to construct a model for an in-store employee; and a classifying tool storable in memory and executable by at least one processing unit, further comprising matching tool configured to: match attributes between a particular person and the constructed models for an in-store employee, the classifying tool configured to: classify persons into categories of employees and customers based on the amount of matching attributes between a particular person and the model for an in-store employee.

In a third embodiment, there is a computer-readable medium storing computer instructions, which when executed, enables a computer system to automatically distinguish in-store employees from in-store customers, the computer instructions comprising: learning attributes of in-store employees for constructing a model for an in-store employee; and classifying persons into categories of employees and customers based on amount of matching attributes between a particular person and said model for an in-store employee.

In a fourth embodiment, there is a method for deploying a distinguishing tool for use in a computer system that automatically distinguishes in-store employees from in-store customers, the method comprising: providing a computer infrastructure operable to: learn attributes of in-store employees for constructing a model for an in-store employee; and classify persons into categories of employees and customers based on the amount of matching attributes between a particular person and said model for an in-store employee.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to automatically classifying and distinguishing in-store employees from in-store customers by analyzing video input from cameras deployed in retail stores. The framework proposed in the current invention learns the joint distribution of spatial properties and appearance models of the observed objects in the camera field-of-view. The advantages of the current invention include ability to learn an employee and customer models in an automatic and unsupervised fashion, and ability to provide critical information to other applications in retail surveillance and security framework.

In one embodiment, there is a method for automatically distinguishing in-store employees from in-store customers, the method comprising: learning attributes of in-store employees for constructing a model for an in-store employee; and classifying persons into categories of employees and customers based on an amount of matching attributes between a particular person and the constructed model for an in-store employee.

In a second embodiment, there is a system for automatically distinguishing in-store employees from in-store customers, the system comprising: at least one processing unit; memory operably associated with the at least one processing unit; a learning tool storable in memory and executable by the at least one processing unit, the learning tool configured to construct a model for an in-store employee; and a classifying tool storable in memory and executable by at least one processing unit, further comprising matching tool configured to: match attributes between a particular person and the constructed models for an in-store employee, the classifying tool configured to: classify persons into categories of employees and customers based on the amount of matching attributes between a particular person and the model for an in-store employee.

In a third embodiment, there is a computer-readable medium storing computer instructions, which when executed, enables a computer system to automatically distinguish in-store employees from in-store customers, the computer instructions comprising: learning attributes of in-store employees for constructing a model for an in-store employee; and classifying persons into categories of employees and customers based on amount of matching attributes between a particular person and said model for an in-store employee.

In a fourth embodiment, there is a method for deploying a distinguishing tool for use in a computer system that automatically distinguishes in-store employees from in-store customers, the method comprising: providing a computer infrastructure operable to: learn attributes of in-store employees for constructing a model for an in-store employee; and classify persons into categories of employees and customers based on the amount of matching attributes between a particular person and said model for an in-store employee.

Figure 1:
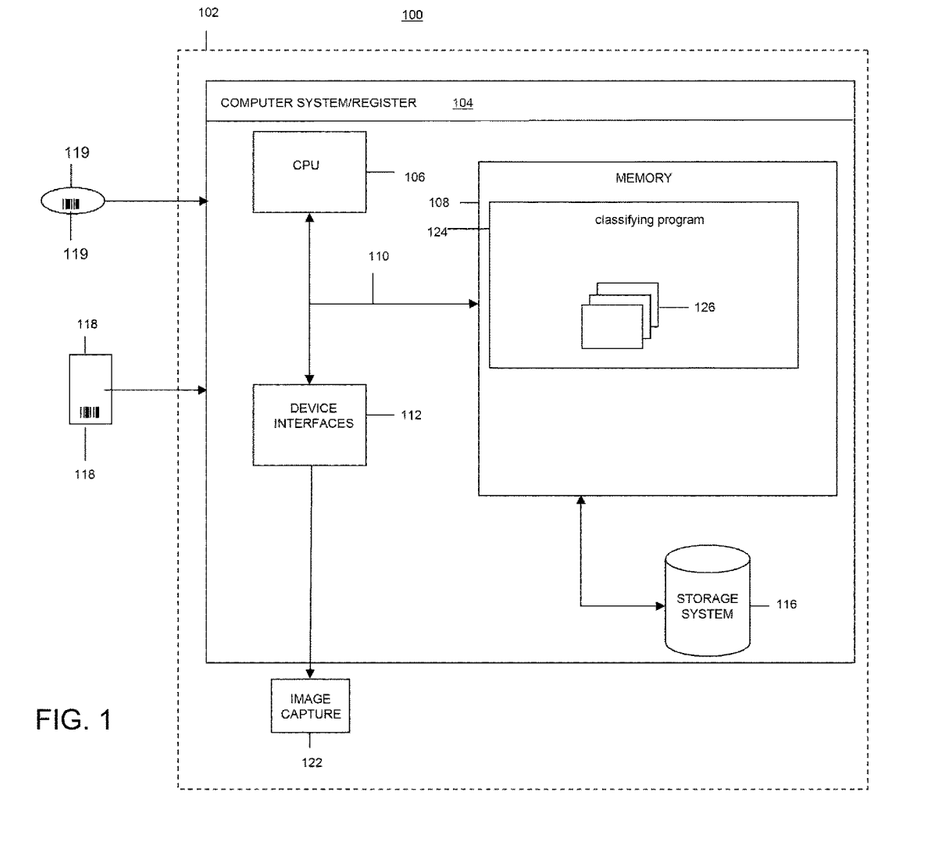
FIG. 1 shows a schematic of an exemplary computing environment in which elements of the present invention may operate.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for distinguishing in-store employees from in-store customers. It should be understood that any other computers implemented under the present invention may have different components/software, but will perform similar functions. As shown, computer system 104 includes a processing unit 106 capable of analyzing video surveillance, and producing a usable output, e.g., compressed video and video meta-data. Also shown is memory 108 for storing a classifying program 124, a bus 110, and device interfaces 112.

Computer system 104 is shown communicating with one or more image capture devices 122 that communicate with bus 110 via device interfaces 112.

Processing unit 106 collects and routes signals representing outputs from image capture devices 122 to classifying program 124. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the video signals may be encrypted using, for example, trusted key-pair encryption. Different capture devices may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)). In some embodiments, image capture devices 122 are capable of two-way communication, and thus can receive signals (to power up, to sound an alert, etc.) from classifying program 124.

In general, processing unit 106 executes computer program code, such as program code for executing classifying program 124, which is stored in memory 108 and/or storage system 116. While executing computer program code, processing unit 106 can read and/or write data to/from memory 108 and storage system 116. Storage system 116 stores video metadata generated by processing unit 106, as well as rules and attributes against which the metadata is compared to identify objects and attributes of objects present within scan area (not shown). Storage system 116 can include VCRs, DVRs, RAID arrays, USB hard drives, optical disk recorders, flash storage devices, image analysis devices, general purpose computers, video enhancement devices, de-interlacers, scalers, and/or other video or data processing and storage elements for storing and/or processing video. The video signals can be captured and stored in various analog and/or digital formats, including, but not limited to, Nation Television System Committee (NTSC), Phase Alternating Line (PAL), and Sequential Color with Memory (SECAM), uncompressed digital signals using DVI or HDMI connections, and/or compressed digital signals based on a common codec format (e.g., MPEG, MPEG2, MPEG4, or H.264).

Although not shown, computer system 104 could also include I/O interfaces that communicate with one or more external devices 118 that enable a user to interact with computer system 104 (e.g., a keyboard, a pointing device, a display, etc.).

Figure 2:
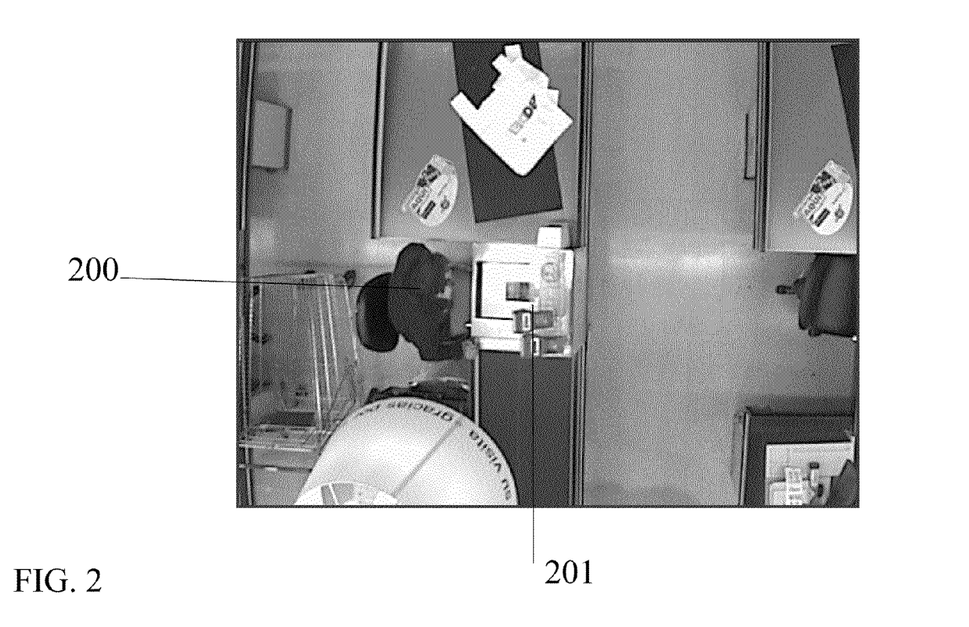
FIG. 2 shows an in-store employee detected and tracked by a surveillance system.
Figure 4:
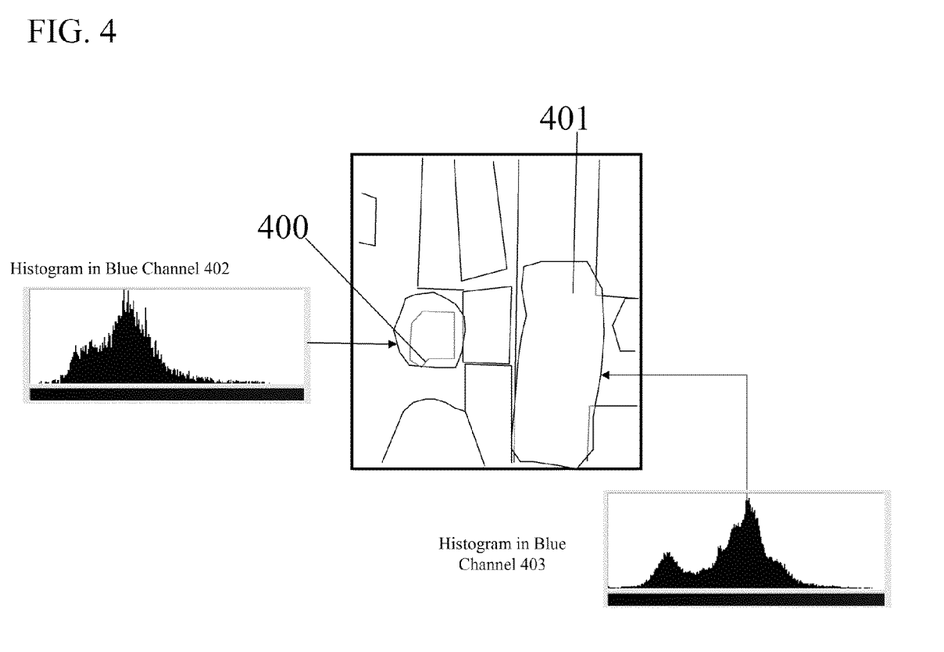
FIG. 4 depicts a sample process of learning of attributes of in-store employees and classifying persons into categories of employees and customers.

FIG. 2 depicts an image captured by a surveillance system of an in-store employee 200. Computer system 104 (FIG. 1) further learns attributes of the in-store employee 200 needed for constructing of a model for an in-store employee 400

(FIG. 4). Such attributes include object's spatial features such as his proximity to the POS system 201 (FIG. 2), frequency of his movements and rarity of his location changing.

In one embodiment, known employees' attributes are entered into the system manually. For instance, in stores utilizing employee uniforms, colors and designs of such uniforms are entered into the system for streamlining the process of learning of attributes of in-store employees 200.

Figure 3:
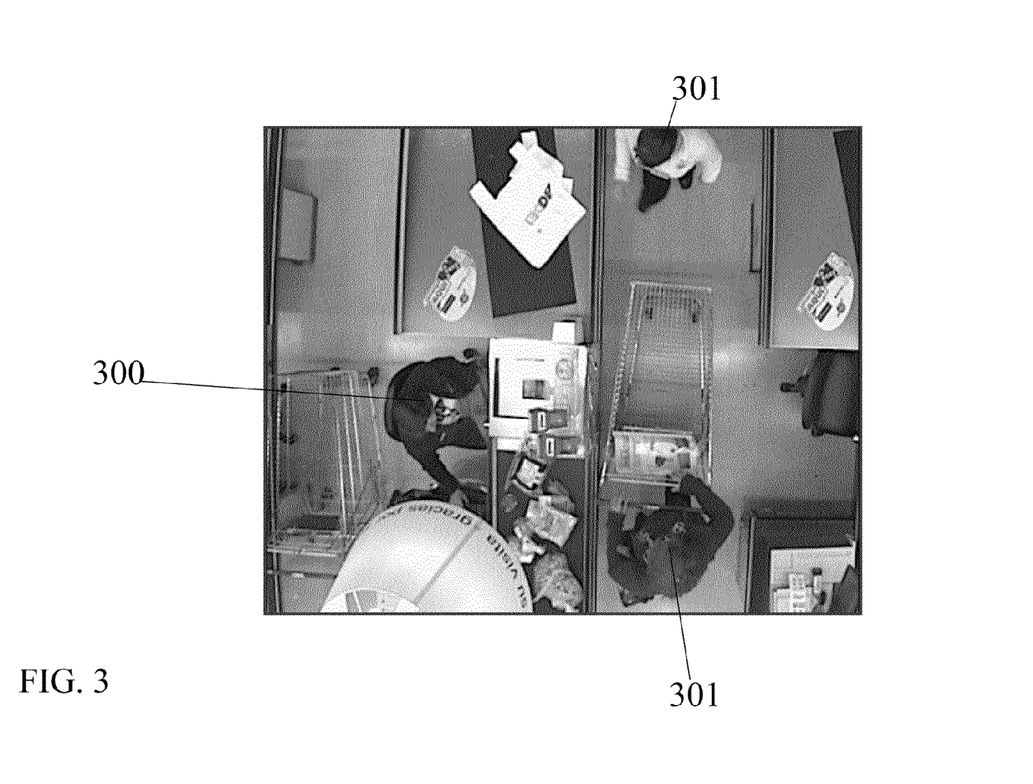
FIG. 3 shows an in-store employee and in-store customers detected by a surveillance system.

FIG. 3 illustrates an image captured by a surveillance system of an in-store employee 300 and in-store customers 301. Further, as shown in FIG. 4 The computer system 104 (FIG. 1) distinguishes, utilizing classifying program 124 (FIG. 1), between the in-store employee model 400 and customer model 401 by extracting and analyzing location, velocity and moving trajectory of the persons detected.

FIG. 4 further illustrates an embodiment where classifying is accomplished by comparing histograms in blue channel 402 and 403. Histogram 403 supports much more variations of appearance and no obvious spatial-appearance cluster, which is illustrative of patterns belonging to customers. However, histogram 402 illustrates coherent spatial distributions of blue consistent with observing employees.

Figure 5:
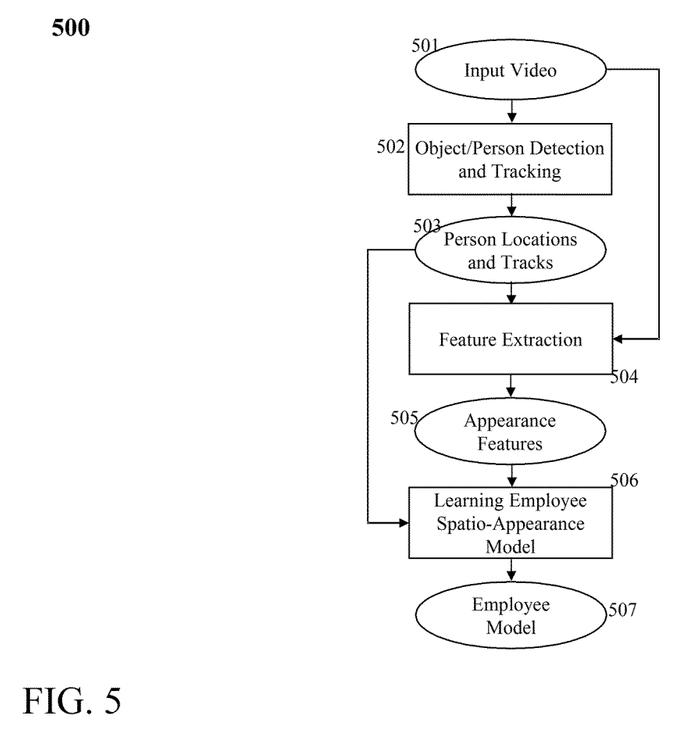
FIG. 5 further illustrates the flow chart of the learning process.

FIG. 5 depicts the flow chart of the process of learning attributes for an employee model. Input video 501 relays data to object or person detection and tracking module 502. The data is later analyzed at 503 for persons' locations and tracks between such locations. At 504 analyzed data is combined with feature extraction gathered at input video 501 and thereafter combined with appearance features at 505. At 506 all data collected is combined with the results of analysis for persons' locations and tracks, and hereby learning of employee spatial—appearance model is performed to establish a final employee model at 507.

Figure 6:
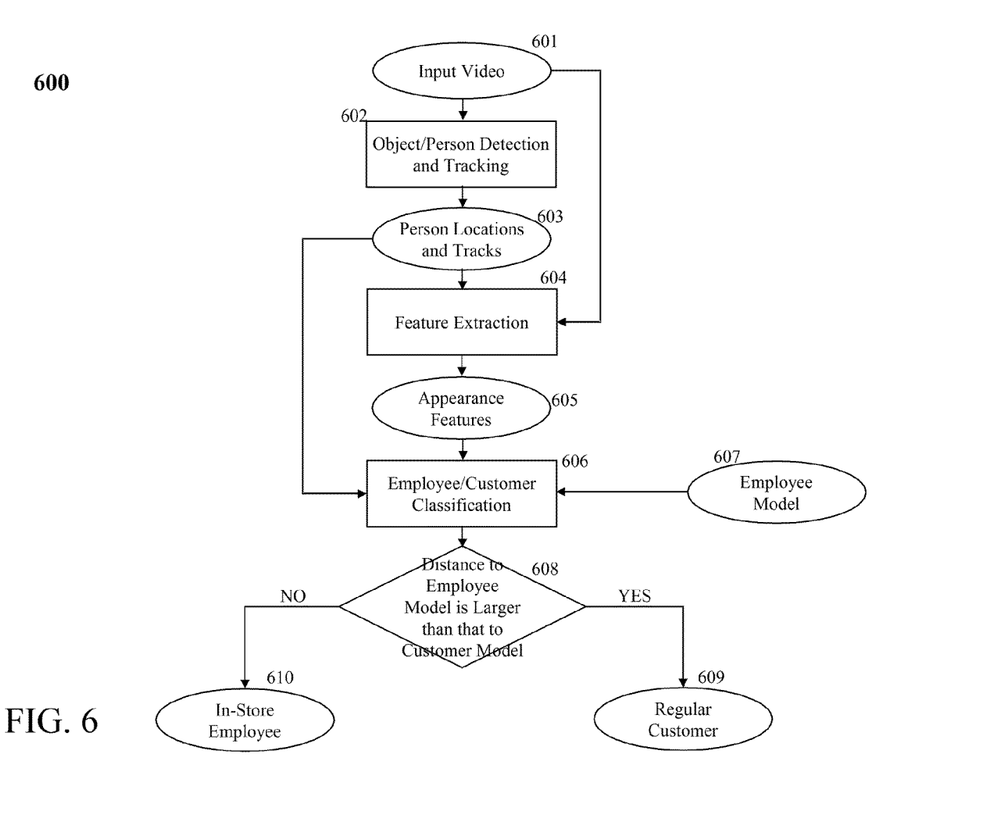
FIG. 6 further illustrates the flow chart of classifying process.

FIG. 6 depicts a flow chart of classifying process. As such, video input 601 is again passed to object/person detection and tracking mechanism and at the same time to feature extraction 604. Object person detection and tracking taking place at 602 is further passed down to person locations and tracks 603. Further, feature extraction taken place at 604, person location and tracks 603 and appearance features 605 are all analyzed at employee/customer classification 606 now with an input of a known employee model 607. If it is determined that distance to employee model is larger than that to customer model then the tracked person is an in-store customer 609, otherwise if the distance to employee model is not larger than that to customer model then the tracked person is an in-store employee 610.

In another embodiment, the employee model could also be updated on-line. In such an embodiment, an initial employee model is constructed by following the procedure described above and depicted in FIG. 5, and this initial employee model is fed into the classification procedure described above and depicted in FIG. 6. For each tracked and analyzed person, if the classification is highly confident (e.g., system confidently classifies an employee with 0.9 score in a 0~1 basis), then the features of this person (appearance and spatial features) are used to update the employee model by following the same steps of 503, 505 and 506. The updated employee model is used when classifying subsequently tracked and analyzed persons, and the on-line update is repeated using the same criteria.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

What is claimed is:

1. A method for automatically distinguishing in-store employees from in-store customers, said method comprising:
    analyzing video input from cameras deployed in retail stores;
    identifying location of an in-store employee in data captured from said video input for constructing a model of an in-store employee;
    learning joint distribution of spatial properties and appearance models of objects in said camera field of view; and
    distinguishing attributes of in-store employees and of shoppers entering retail stores for constructing a model for an in-store employee, said distinguishing comprising:
    recognizing patterns of clothes worn by in-store employees;
    recognizing colors of clothes worn by in-store employees;
    comparing histograms in a blue channel to separate between histograms supporting more variations of appearance and no obvious spatial appearance clusters, illustrative of patterns belonging to customers and histograms supporting coherent spatial distributions of blue consistent of patterns belonging to employees; and classifying persons into categories of in-store employees and customers based on said identified location of an in-store employee, based on said learning of spatial properties and appearance models of objects in said camera field of view, based on said comparing histograms and based on said distinguishing attributes of in-store employees and shoppers entering retails stores.

2. The method according to claim 1, said learning attributes of an in store employee further comprising:

extracting appearance and spatial features of people; and
iteratively learning the models in the joint probability of appearance and spatial features.

3. The method according to claim 2, wherein said learning method is parametric.

4. The method according to claim 2, wherein said learning method is non-parametric.

5. The method according to claim 1, said classifying further comprising:

extracting appearance and spatial features of a detected and tracked person;
comparing said extracted features with said employee model obtained during learning, said comparing comprising matching attributes of a particular person and the constructed model for in-store employee, and
determining whether said detected and tracked person is an in-store employee or an in-store customer, said determining based on amount of matching attributes between said particular person and the model for an in-store employee.

6. A system for automatically distinguishing in-store employees from in-store customers, said system comprising:

at least one processing unit;
memory operably associated with the at least one processing unit;
an analyzing tool storable in memory and executable by the at least one processing unit, the analyzing tool configured to analyze video input from cameras deployed in retail stores;
an identifying tool storable in memory and executable by the at least one processing unit, the identifying tool is configured to identify location of an in-store employee in data captured from said video input for constructing a model of an in-store employee;
a learning tool storable in memory and executable by the at least one processing unit, the learning tool configured to learn joint distribution of spatial properties and appearance models of objects in said camera field of view;
a distinguishing tool storable in memory and executable by the at least one processing unit, the distinguishing tool configured to distinguish attributes of in-store employees and of shoppers entering retail stores for constructing a model for an in-store employee, said distinguishing comprising:
recognizing patterns of clothes worn by in-store employees;
recognizing colors of clothes worn by in-store employees;
comparing histograms in a blue channel to separate between histograms supporting more variations of appearance and no obvious spatial appearance clusters, illustrative of patterns belonging to customers and histograms supporting coherent spatial distributions of blue consistent of patterns belonging to employees; and a classifying tool storable in memory and executable by at least one processing unit, the classifying tool configured to classify persons into categories of in-store employees and customers based on said identified location of an in-store employee, based on said learning of spatial properties and appearance models of objects in said camera field of view, based on said comparing histograms and based on said distinguishing attributes of in-store employees and shoppers entering retails.

7. The learning tool according to claim 6 further comprising:

an extracting component configured to extract appearance and spatial features of people,
and iteratively learning component configured to iteratively learn the models in the joint probability of appearance and spatial features.

8. The iteratively learning component according to claim 7, said component further configured to learn parametrically.

9. The iteratively learning component according to claim 7, said component further configured to learn non-parametrically.

10. The classifying tool according to claim 6, further comprising:

an extracting component configured to extract appearance and spatial features of a detected and tracked person;
a comparing component configured to compare said extracted features with said employee model created by learning tool, further comprising matching tool configured to match attributes of a particular person and the constructed model for in-store employee, and
a determining component, configured to determine whether said detected and tracked person is an in-store employee or an in-store customer, further comprising a counting component configured to count amount of matching attributes between said particular person and the model for in-store employee.

11. A non-transitory computer-readable storage device storing computer instructions, which when executed, enables a computer system to automatically distinguish in-store employees from in-store customers, the computer instructions comprising:

analyzing video input from cameras deployed in retail stores;
identifying location of an in-store employee in data captured from said video input for constructing a model of an in-store employee;
learning joint distribution of spatial properties and appearance models of objects in said camera field of view; and
distinguishing attributes of in-store employees and of shoppers entering retail stores for constructing a model for an in-store employee, said distinguishing comprising:
recognizing patterns of clothes worn by in-store employees;
recognizing colors of clothes worn by in-store employees,
comparing histograms in a blue channel to separate between histograms supporting more variations of appearance and no obvious spatial appearance clusters, illustrative of patterns belonging to customers and histograms supporting coherent spatial distributions of blue consistent of patterns belonging to employees; and
classifying persons into categories of in-store employees and customers based on said identified location of an in-store employee, based on said learning of spatial properties and appearance models of objects in said camera field of view, based on said comparing histograms and based on said distinguishing attributes of in-store employees and shoppers entering retails stores.

12. The non-transitory computer-readable storage device according to claim 11 further comprising computer instructions for
extracting appearance and spatial features of people; and
iteratively learning the models in the joint probability of appearance and spatial features.

13. The non-transitory computer-readable storage device according to claim 12, wherein said learning method is parametric.

14. The non-transitory computer-readable storage device according to claim 12, wherein said learning method is non-parametric.

15. The non-transitory computer-readable storage device according to claim 11, said classifying computer instructions further comprising:
extracting appearance and spatial features of a detected and tracked person;
comparing said extracted features with said employee model obtained during learning, said comparing comprising matching attributes of a particular person and the constructed model for in-store employee; and
determining whether said detected and tracked person is an in-store employee or an in-store customer, said determining based on amount of matching attributes between said particular person and the model for an in-store employee.

16. A method for deploying a distinguishing tool for use in a computer system that automatically distinguishes in store employees from in-store customers, said method comprising:
providing a computer infrastructure operable to:
analyze video input from cameras deployed in retail stores;
identify location of an in-store employee in data captured from said video input for constructing a model of an in-store employee;
learn joint distribution of spatial properties and appearance models of objects in said camera field of view; and
distinguish attributes of in-store employees and of shoppers entering retail stores for constructing a model for an in-store employee, said distinguishing comprising:
recognizing patterns of clothes worn by in-store employees;
recognizing colors of clothes worn by in-store employees; comparing histograms in a blue channel to separate between histograms supporting more variations of appearance and no obvious spatial appearance clusters, illustrative of patterns belonging to customers and histograms supporting coherent spatial distributions of blue consistent of patterns belonging to employees; and
classifying persons into categories of in-store employees and customers based on said identified location of an in-store employee, based on said learning of spatial properties and appearance models of objects in said camera field of view, based on said comparing histograms and based on said distinguishing attributes of in-store employees and shoppers entering retails stores.

17. The method according to claim 16, the computer infrastructure further operable to:
extract appearance and spatial features of people; and
iteratively learn the models in the joint probability of appearance and spatial features.

18. The method according to claim 17, wherein said learning method is parametric.

19. The method according to claim 17, wherein said learning method is non-parametric.

20. The method according to claim 16, said classifying further comprising:
extracting appearance and spatial features of a detected and tracked person;
comparing said extracted features with said employee model obtained during learning, said comparing comprising matching attributes of a particular person and the constructed model for in-store employee, and
determining whether said detected and tracked person is an in-store employee or an in-store customer, said determining based on amount of matching attributes between said particular person and the model for an in-store employee.

\* \* \* \* \*